United States Patent
Eschtruth

(10) Patent No.: US 10,385,972 B2
(45) Date of Patent: Aug. 20, 2019

(54) SELF-SEALING BELLOWS FOR USE WITH VEHICLES

(71) Applicant: Ford Global Technologies, LLC, Dearborn, MI (US)

(72) Inventor: Kirt Eschtruth, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 25 days.

(21) Appl. No.: 15/639,879

(22) Filed: Jun. 30, 2017

(65) Prior Publication Data

US 2019/0003592 A1    Jan. 3, 2019

(51) Int. Cl.
| | | |
|---|---|---|
| *F16J 15/50* | (2006.01) | |
| *F16J 3/04* | (2006.01) | |
| *F16J 15/00* | (2006.01) | |
| *F16J 15/36* | (2006.01) | |

(52) U.S. Cl.
CPC ............. *F16J 15/008* (2013.01); *F16J 3/041* (2013.01); *F16J 15/36* (2013.01)

(58) Field of Classification Search
CPC ......... F16J 15/008; F16J 15/36; F16J 15/363; F16J 15/366; F16J 3/00; F16J 3/04; F16J 3/041; F16J 3/043; F16J 3/045; F16J 3/046
See application file for complete search history.

(56) References Cited

U.S. PATENT DOCUMENTS

| | | | | |
|---|---|---|---|---|
| 4,180,101 A | * | 12/1979 | Wegge | F16L 7/00 138/103 |
| 4,558,869 A | * | 12/1985 | Grove | F16J 3/046 156/308.6 |
| 4,573,693 A | * | 3/1986 | Nakata | F16D 3/845 277/636 |
| 5,222,746 A | * | 6/1993 | Van Steenbrugge | B29C 66/124 277/630 |
| 6,951,336 B2 | * | 10/2005 | Martin | B29C 43/56 264/508 |
| 8,136,816 B1 | | 3/2012 | Lou | |
| 2008/0006111 A1 | | 1/2008 | Douma et al. | |

FOREIGN PATENT DOCUMENTS

| | | |
|---|---|---|
| CA | 2083580 | 5/1994 |
| DE | 60211090 | 8/2006 |
| DE | 102013224535 | 1/2016 |
| JP | 2010069909 | 4/2010 |

* cited by examiner

*Primary Examiner* — Gilbert Y Lee
(74) *Attorney, Agent, or Firm* — Ray Coppiellie; Hanley, Flight & Zimmerman, LLC

(57) ABSTRACT

Self-sealing bellows for use with vehicles are disclosed. An example bellows includes a tubular body being expandable and contractible along an axis of the body. The bellows also includes a lining disposed along a surface of the body and a liquid or gelatinous material disposed between the body and the lining. The liquid or gelatinous material hardens when exposed to a fluid.

20 Claims, 5 Drawing Sheets

SELF-SEALING BELLOWS FOR USE WITH VEHICLES

FIELD OF THE DISCLOSURE

This disclosure relates generally to vehicles and, more particularly, to self-sealing bellows for use with vehicles.

BACKGROUND

Vehicles typically include a steering assembly to turn or angle one or more wheels of the vehicle to steer the vehicle while driving. Known steering assemblies include rack and pinion gears that translate rotational motion of a steering wheel to linear actuation or movement of one or more tie rods. The tie rods change the angle of the wheel(s), thereby turning the wheels and steering the vehicle. Such steering assemblies have components that are sensitive to elements of the environment and tend to fail without proper protection, such as the rack and pinion gears, the connection between the rack and the tie rods, etc. Often, to prevent steering malfunction or failure during normal vehicle use, bellows (sometimes referred to as boots) are employed to cover these types of sensitive components and provide a sealed housing isolated from the environment. Conventional bellows are typically flexible to accommodate the moving components (e.g., the tie rods) therein. For example, during a steering operation or a vehicle maneuver, the rack and pinion gears cause the tie rods to move relative to other components of the steering assembly. The bellows expand and contract to accommodate such movement, thereby providing continuous protection for steering components.

SUMMARY

An example bellows disclosed herein includes a tubular body being expandable and contractible along an axis of the body. The example bellows also includes a lining disposed along a surface of the body and a liquid or gelatinous material disposed between the body and the lining. The liquid or gelatinous material is to harden when exposed to a fluid.

An example vehicle disclosed herein includes a steering assembly and a bellows covering at least a portion of the steering assembly. The bellows has a sealing material that, when the bellows is punctured, hardens to seal the puncture.

An example bellows disclosed herein includes a tubular body being expandable and contractible along an axis of the body. The example bellows also includes means for sealing an opening in the body when the body is punctured.

Figure 1:
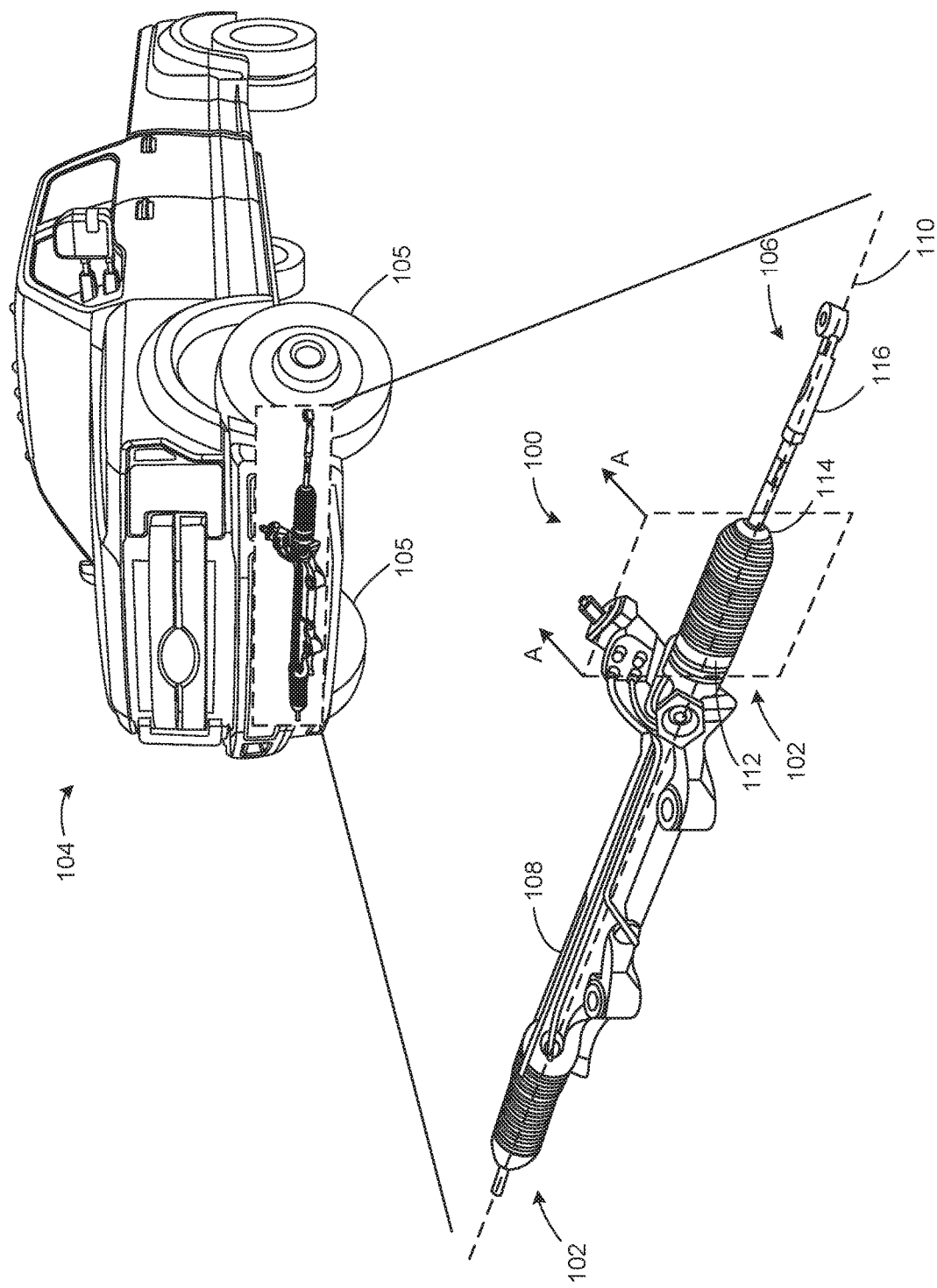
FIG. 1 is a schematic illustration of an example steering assembly having example bellows constructed in accordance with the teachings of this disclosure.

The figures disclosed herein are not to scale. Wherever possible, the same reference numbers will be used throughout the drawings and accompanying written descriptions to refer to the same or like parts. As used in this disclosure, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Conventional bellows are designed to cover sensitive steering components (e.g., components associated with rack and pinion gears, joints between tie rods, etc.) of a vehicle and provide protection from the environment during normal vehicle use. However, these conventional bellows are prone to damage such as punctures, cuts, tears, abrasions, etc. For example, while driving, road debris may be launched from the road into the under carriage of the vehicle and may cut or penetrate the bellows. As another example, a service provider may inadvertently puncture (e.g., via a servicing tool) the bellows during vehicle maintenance. As a result, dirt, sand, water, etc. may enter the bellows and adversely affect the components contained therein.

Steering assemblies typically have components that are precision formed such that the component(s) have smooth surfaces and low or tight tolerances that need to be maintained and protected from small particles that significantly increase wear or cause abrasion of the surfaces. Thus, such components protected by these conventional bellows are prone to damage and/or failure caused by exposure to elements of the environment (e.g., water, dirt, etc.), which can result in steering malfunction of the vehicle and costly repairs for the steering components.

To increase service life of these conventional bellows and the components they protect, some manufacturers select certain materials to fabricate the bellows based on their properties (e.g., flexibility or elasticity, thermal resistance, puncture or tear resistance, toughness, etc.). However, even the best application of this known design practice leaves an undesired residual failure rate of the bellows as well as the components they protect.

Example self-sealing bellows are disclosed herein. In general, example bellows disclosed herein include a flowable sealing material that sets, cures, strengthens, hardens, and/or otherwise changes state (e.g., from a liquid or gelatinous state to a solid or semi-solid state) when exposed to a fluid (e.g., air, water, etc.) when the body of the bellows is punctured or damaged, which may reinforce and/or strengthen a portion of the body surrounding the puncture or damage. Thus, examples disclosed herein compensate for and/or repair damage (e.g., punctures, cuts, tears, abrasions, etc.) to the bellows that may occur while driving, during vehicle maintenance, etc. As such, the examples disclosed herein increase and/or maximize protection for sensitive steering components throughout a vehicle's life. By enabling the bellows to remain sealed, damage and/or failure to the sensitive steering components is prevented while reducing and/or minimizing associated costs and labor that would have otherwise been required or incurred from using conventional bellows.

An example bellows disclosed herein includes a tubular body that is expandable and contractible along an axis of the body. The bellows may be disposed on and/or around one or more parts of a vehicle, such as a connection or joint between an inner tie rod and an outer tie rod of a vehicle. The bellows has a flowable sealing material that hardens to seal any and/or all openings in the body. For example, if the body of the bellows is punctured, ripped, torn and/or otherwise forms an opening, the sealing material is exposed to the air and sets or cures, thereby sealing the opening.

In some examples, a lining (e.g., a wax or plastic lining) is disposed along a surface of the body to contain the sealing material between the surface of the body and the lining. If the body and/or the lining are punctured, the sealing material seeps or flows out of the opening, where it is exposed to the outside air and hardens to form a seal. In some examples, the lining is shaped to match a contour or profile of the body, which may enable the bellows to easily expand and contract. For example, the lining may include ribs that match the corresponding ribs of the body.

The lining can be integral with the body and/or coupled to the body. In some examples, the lining may be coupled (e.g., via clamps, fasteners, adhesives, etc.) to one or both ends of the body. In some examples, the lining surrounds an outer surface of the body. In other examples, the lining is disposed along an inner surface of the body. As such, an annular channel is defined between the lining and the body that extends along a length the body. In such examples, the sealing material is contained in the channel and can displace from the channel when the bellows are damaged.

In some examples, the sealing material is a liquid or gelatinous material. The sealing material may be relatively viscous to prevent the sealing material from leaking or flowing out of an opening too fast before forming a seal. For example, if an opening is formed in the bellows, the sealing material may slowly flow or displace through the opening in the bellows to harden and seal the opening before an excessive amount of the sealing material displaces from the channel. In some examples, the sealing material is a polymer based material that hardens to form a seal when exposed to a fluid. In other examples, other suitable materials and/or chemicals may be used.

FIG. 1 is a schematic illustration of an example steering assembly 100 having example bellows 102 constructed in accordance with the teachings of this disclosure. In this example, the steering assembly 100 is part of a vehicle 104 (e.g., a car, a van, a truck, etc.). The steering assembly 100 is used to steer the vehicle 104 by turning or angling the front wheels 105 of the vehicle 104. In the illustrated example, the steering assembly 100 includes two bellows 102 (one on the left and one on the right in FIG. 1). However, for clarity, the examples disclosed below refer to a single bellows 102. Any of the example aspects disclosed in connection with one of the bellows 102 can likewise be applied to the other bellows 102. In other examples, any suitable number of bellows 102 can be used with the vehicle 104 and/or the steering assembly 100. Additionally or alternatively, the bellows 102 of the illustrated example can be advantageously used in other locations of the vehicle 104 in accordance with the teachings of this disclosure.

In the illustrated example of FIG. 1, the bellows 102 covers a portion of a tie rod assembly 106 that extends through a housing 108 of the steering assembly 100. The bellows 102 provides a sealed space therein for sensitive components of the steering assembly 100, which is disclosed in greater detail below in connection with FIG. 2. For example, a connection or joint 212 (shown in FIG. 2) of the tie rod assembly 106, a rack and pinon gear mechanism, etc., is/are prone to damage from elements of the environment, such as debris, dirt, sand, water, etc. These types of harmful elements cause failure and/or malfunction of the steering assembly 100 when exposed to such sensitive components.

In the illustrated example, the bellows 102 expands and/or contracts along an axis 110 to move with the part(s) of the tie rod assembly 106 contained therein. For example, during a steering operation, the tie rod assembly 106 moves an outer tie rod 116 along the axis 110 relative to the housing 108 to turn one of the wheels 105 and steer the vehicle 104. In some examples, a first end 112 of the bellows 102 is coupled to the housing 108 and a second end 114 of the bellows 102, opposite the first end 112, is coupled to the outer tie rod 116. As the outer tie rod 116 moves relative to the housing 108, the bellows 102 expands or contracts. In other examples, other portions of the bellows 102 can be coupled to other portions of the tie rod assembly 106 and/or, more generally, the steering assembly 100 using one or more suitable fasteners and/or fastening techniques.

Figure 2:
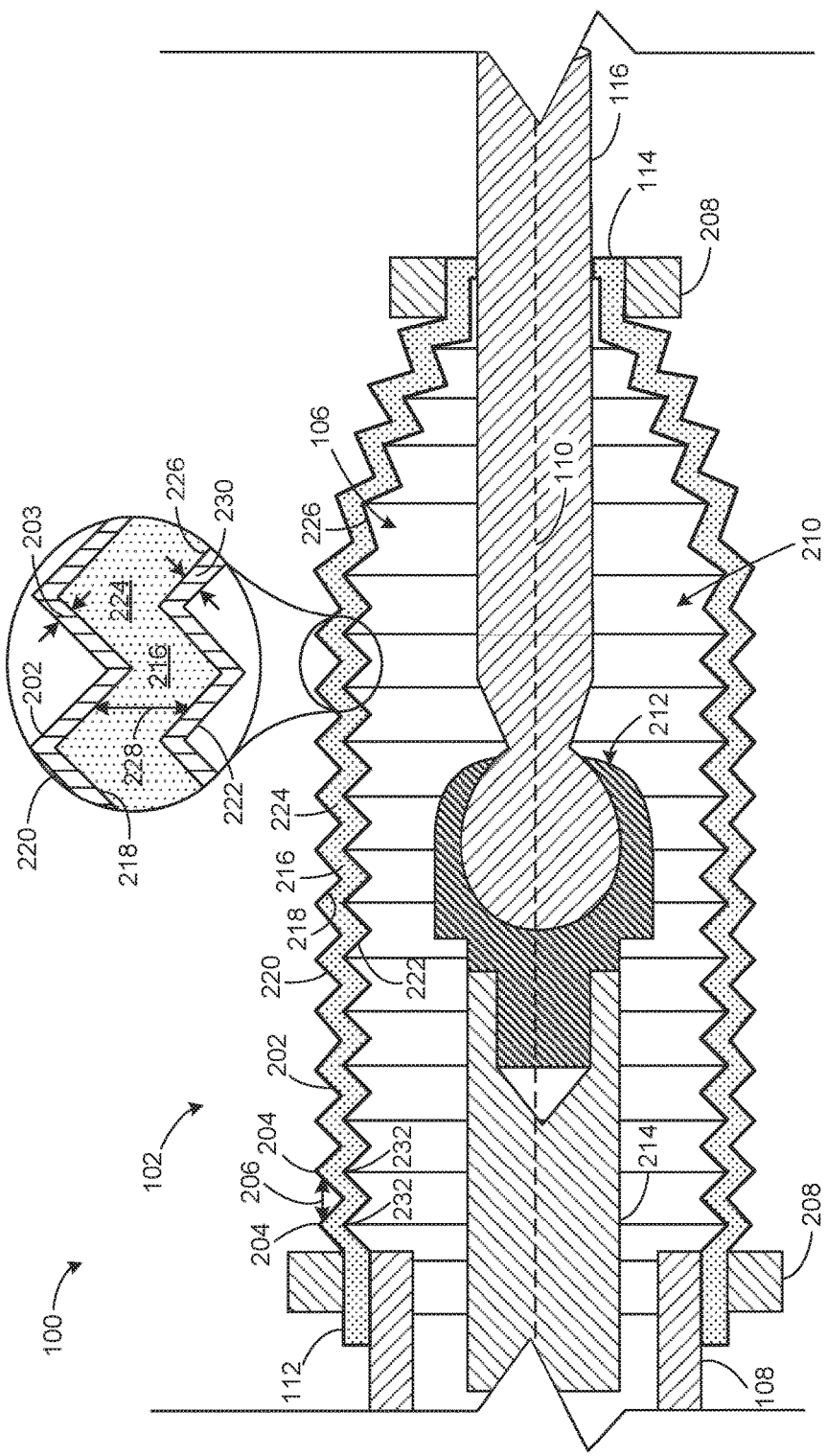
FIG. 2 is a cross-sectional view of the example steering assembly and the example bellows of FIG. 1.

FIG. 2 is a cross-sectional view of a portion of the steering assembly 100 and the bellows 102 of FIG. 1 taken along plane A-A in FIG. 1. According to the illustrated example, the bellows 102 has a tubular body 202 that is contractible and expandable along its length and/or the axis 110, which enables the bellows 102 to accommodate movement of the tie rod assembly 106. For example, the body 202 may be constructed of a rubber or elastic material (e.g., a neoprene based rubber, a silicone based rubber, etc.). In other examples, the body 202 may be constructed out of other suitable materials. In some examples, the body 202 has a particular thickness 203, which may affect flexibility of the bellows 102. Additionally, the body 202 of the bellows 102 of the illustrated example has a contour or profile that enhances the flexibility of the bellows 102. In this example, the body 202 has ribs 204 disposed along its length and spaced by a distance 206 from each other, which forms a folded or an accordion shaped profile. For clarity, only two ribs 204 are referred to in the illustrated example, although the bellows 102 may include additional or fewer ribs 204. In other examples, the bellows 102 may have any other suitable profile to provide and/or enhance the flexibility, such as annular protrusions and/or recesses disposed along the length of the body 202.

In the illustrated example, the first end 112 of the bellows 102 is coupled to the housing 108 and the second end 114 of the bellows 102 is coupled to the outer tie rod 116. In this example, the first end 112 and the second end 114 are coupled to the housing 108 and the outer tie rod 116, respectively, via clamps 208 that surround the body 202. In other examples, the first end 112 and the second end 114 may be coupled to the housing 108 and the outer tie rod 116 via any other suitable fastener and/or fastening technique (e.g., via an adhesive). As such, a sealed space 210 is provided within the bellows 102 to contain at least a portion of the tie rod assembly 106 and/or one or more other components of the steering assembly 100 that are prone to damage from the environment. While the bellows 102 may not provide an air tight seal, the bellows 102 generally blocks debris or small particles from entering the sealed space 210. Thus, the bellows 102 provides continuous protection when the body 202 of the bellows 102 remains sealed and/or otherwise free from damage or openings.

In this example, the bellows 102 covers a connection or joint 212 (e.g., a ball joint) between an inner tie rod 214 and the outer tie rod 116 disposed within the sealed space 210 of the bellows 102. The inner tie rod 214 moves in and out of the housing 108 via a rack and pinion gear mechanism, which causes the outer tie rod 116 to move back and forth (e.g., along the axis 110). The outer tie rod 116 of the illustrated example is operatively coupled to one of the wheels 105 (FIG. 1) of the vehicle 104 (FIG. 1). In such examples, the rack and pinion gear mechanism translates rotational motion of a steering wheel of the vehicle 104 to linear actuation of the inner tie rod 214 and the outer tie rod 116, thereby steering the vehicle 104. The rack and pinion gear mechanism, the joint 212, and/or other components of the steering assembly 100 are precision formed and should be properly maintained to avoid malfunction and/or failure. For example, such components rely on smooth surfaces having low tolerances to function. As such, any small particles or foreign matter can cause excessive friction and wear to the surfaces and damage the components. Further, these components are subject to corrosion if exposed to water.

According to the illustrated example, the bellows 102 includes a sealing material 216 disposed along a surface of the bellows 102. In some examples, the sealing material 216 is a liquid or gelatinous material that sets, cures, strengthens, hardens, and/or otherwise changes state (e.g., from a liquid or gelatinous state to a solid or semi-solid state) to form a seal when exposed to a fluid (e.g., air, water, etc.). The sealing material 216 may include any one or more suitable chemical adhesives or sealants, such as silicon, polymer, latex (e.g., natural or synthetic), and/or rubber based materials. In some examples, the sealing material 216 may include fillers, additives, and/or thixotropes (e.g., fibers and/or pulps), which can enhance one or more properties of the sealing material 216 such as a strength and/or increase a viscosity of the sealing material 216. In some examples, the sealing material 216 is relatively viscous such that it tends not to flow quickly, drip and/or separate. As such, the sealing material 216 remains in an advantageous position or location relative to the bellows 102 while hardening and/or forming a seal, which is disclosed in greater detail below in connection with FIG. 3.

In this example, the sealing material 216 is disposed along an inner surface 218 of the body 202. In other examples, the sealing material 216 is disposed along an outer surface 220 of the body 202. In the illustrated example, the sealing material 216 is uniformly distributed on the entire inner surface 218, however, in other examples, the sealing material 216 can be non-uniformly distributed and/or disposed along one or more specific portions of the inner surface 218.

In the illustrated example, the bellows 102 includes a lining 222 to contain the sealing material 216 between the body 202 and the lining 222 along the inner surface 218. For example, the lining 222 may be constructed out of a wax material and/or a plastic material disposed adjacent the tubular body 202 and extending the length of the body 202 along the axis 110. In other examples, the lining 222 can be constructed of any other suitable material having a strength or toughness to contain the sealing material 216 and/or an elasticity to accommodate movement (e.g., contraction and expansion) of the body 202. In the illustrated example, the lining 222 and the body 202 of the bellows 102 are not permeable to fluids such as air and/or water.

In the illustrated example, the lining 222 is positioned within the bellows 102 such that the body 202 surrounds the lining 222. In other examples, the lining 222 may be external to the bellows 102 as disclosed in further detail in connection with FIG. 4. In the illustrated example, an annular channel 224 is defined between the lining 222 and the body 202 and, in particular, between an outer surface 226 of the lining 222 and the inner surface 218 of the body 202. In the illustrated example, the lining 222 is separated from the body 202 by a distance 228, which may be substantially uniform along the length of the channel 224. The channel 224 extends the length of the body 202 and contains the sealing material 216 therein. In some examples, the lining 222 is integral (e.g., molded) with the body 202, which is shown in FIG. 2. For example, the ends of the lining 222 may be molded with the ends of the body 202. In other examples, the lining 222 may be coupled to the body 202 via any other suitable fastener and/or fastening technique. For example, the lining 222 may be coupled to the first end 112 and/or the second end 114 of the body 202 via the clamps 208.

The lining 222 of the illustrated example has a thickness 230. In some examples, the thickness 230 of the lining 222 is substantially the same as the thickness 203 of the body 202 to accommodate the bellows 102 expanding and contracting. In other examples, the thickness 230 of the lining 222 may be different (e.g., less than or greater than) than the thickness 203 of the body 202. Additionally or alternatively, the lining 222 may be shaped to match the contour or profile of the body 202. For example, in the illustrated example of FIG. 2, the lining 222 has ribs 232 that correspond to each of the ribs 204 of the body 202. In other examples, the lining 222 may have any suitable contour or profile that matches the contour or profile of the body 202, which enables the bellows 102 to expand and contract without interference from the lining 222.

Figure 3:
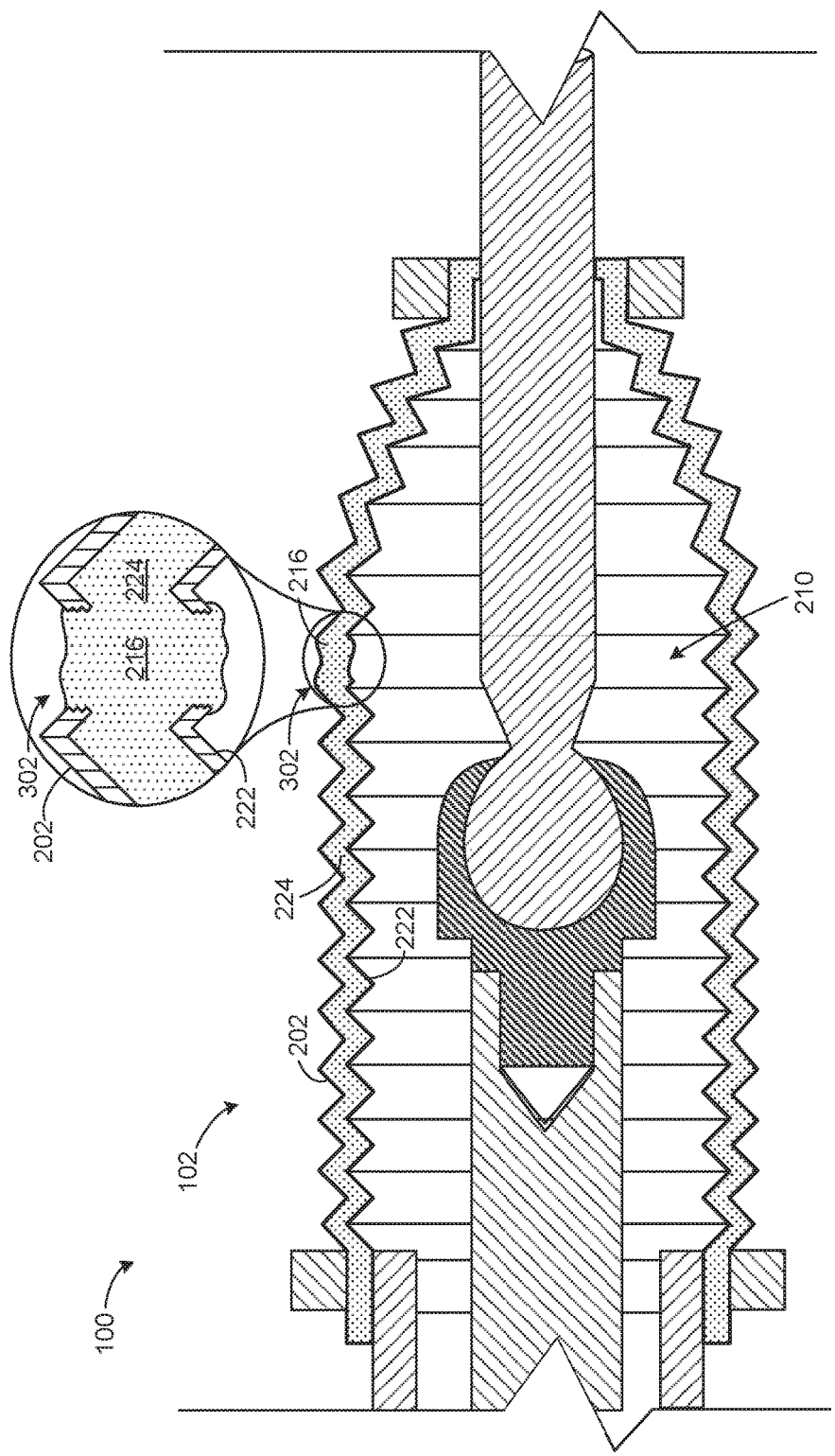
FIG. 3 is a cross-sectional view of the example steering assembly and the example bellows of FIG. 1 showing a puncture in the example bellows.

FIG. 3 is a cross-sectional view of the steering assembly 100 and the bellows 102 of FIG. 1 showing a puncture or opening 302 in the bellows 102. In this example, the opening 302 is formed in both the body 202 and the lining 222. In other examples, one or more openings 302 can be formed in the body 202 and/or the lining 222 in accordance with the teachings of this disclosure. If left unsealed, the opening 302 would compromise the sealed space 210 and expose the components of the steering assembly 100 to the environment.

The opening 302 of the illustrated example can be caused by various sources. For example, the opening 302 may be caused by debris from a road and/or fatigue of the bellows 102 expanding and contracting during normal use. In some examples, the opening 302 is inadvertently caused during vehicle maintenance or servicing. For example, a vehicle servicer may puncture the bellows 102 using a servicing tool (e.g., a screwdriver). In other examples, the bellows 102 can be damaged by any other means.

According to the illustrated example, the sealing material 216 fills the opening 302 formed through the body 202 and the lining 222. As a result, the sealing material 216 is exposed to the air (inside and/or outside of the bellows 102) and sets and/or otherwise reacts with the air to change state (e.g., from a liquid or gelatinous state to a harder or thicker state). Thus, the sealing material 216 seals the opening 302 of body 202 and/or the lining 222 and maintains the sealed space 210 isolated from the environment. In some examples, the sealing material 216 displaces from the channel 224 in response to the bellows 102 being damaged or otherwise forming one or more of the openings 302 in the body 202 and/or the lining 222. In some examples, the sealing material 216 can be a relatively viscous liquid or gelatinous material that tends not to flow quickly, drip and/or separate so as to enable the sealing material 216 to remain at the opening 302 while hardening and/or sealing the opening 302.

Figure 4:
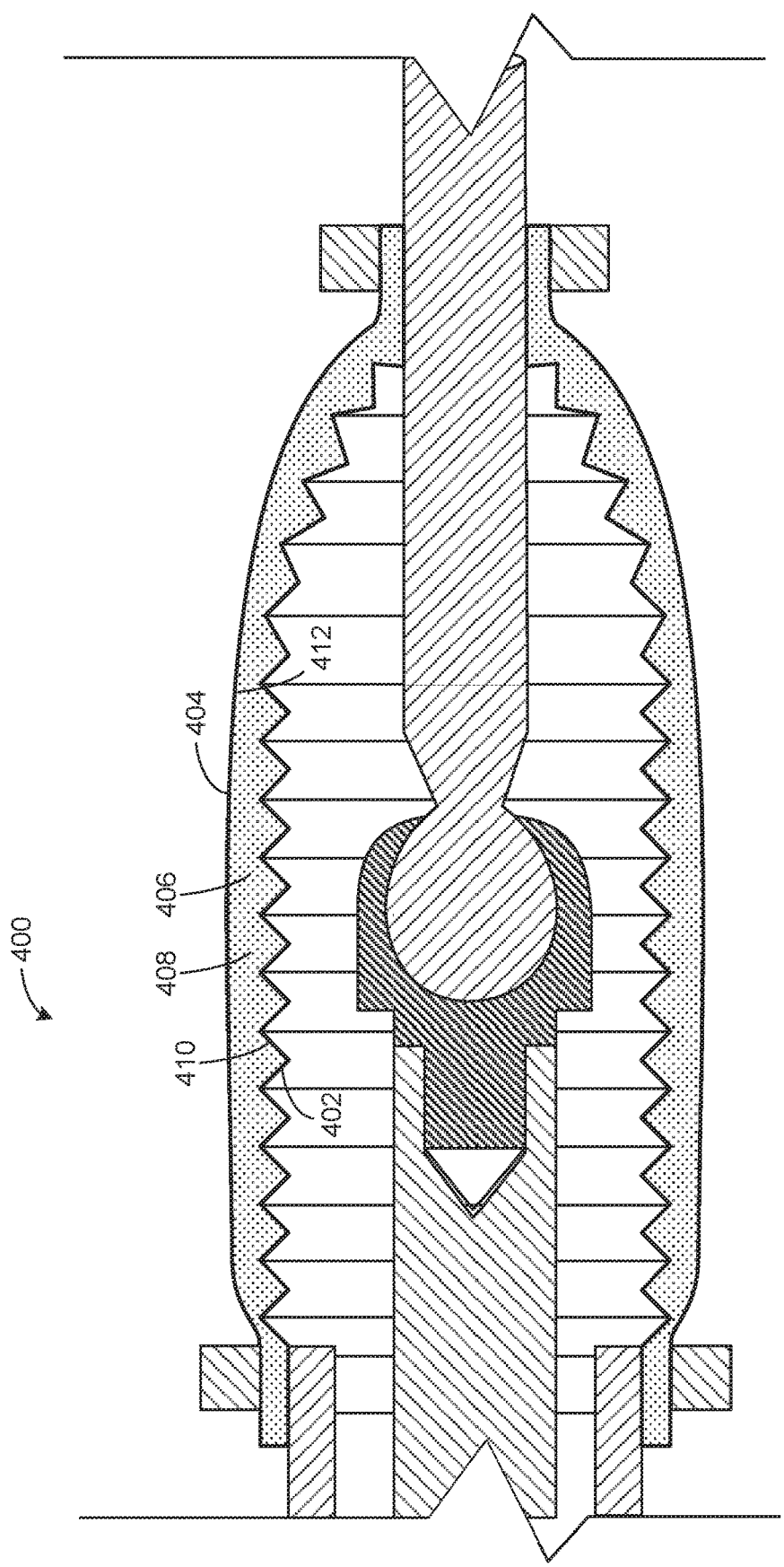
FIGS. 4 and 5 are cross-sectional views of other example bellows that may be implemented with the example steering assembly of FIG. 1.
Figure 5:
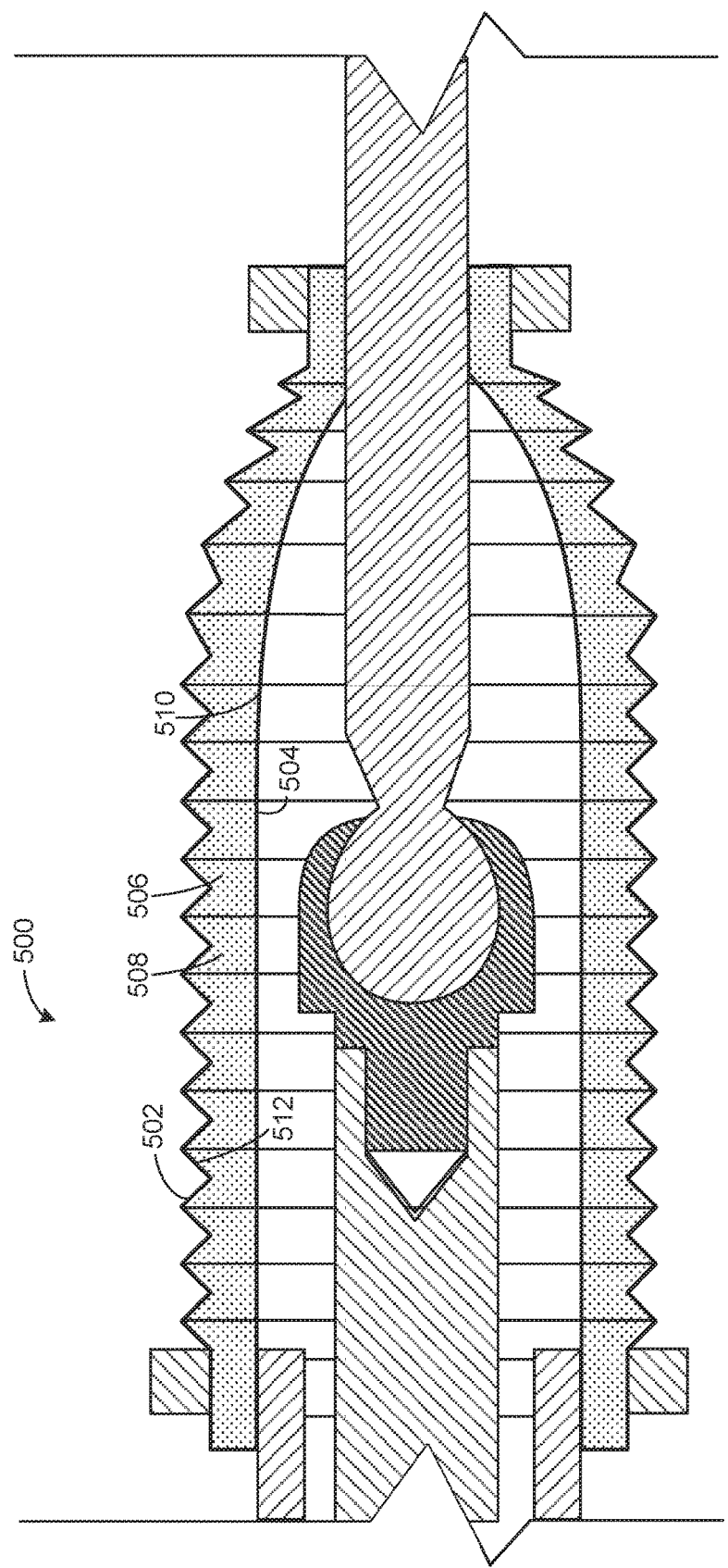

FIGS. 4 and 5 are cross-sectional views of other example bellows 400, 500 that may be implemented with the example steering assembly 100 of FIG. 1. Similar to the bellows 102 of FIGS. 2 and 3, each of the bellows 400, 500 includes a body 402, 502, a lining 404, 504, and a sealing material 406, 506 disposed in an annular channel 408, 508 formed between the body 402, 502 and the lining 404, 504.

In the illustrated example of FIG. 4, the lining 404 is external to and surrounds the body 402. According to the illustrated example, the sealing material 406 is disposed between an outer surface 410 of the body 402 and an inner surface 412 of the lining 404. In this example, the lining 404 is smooth and does not match the profile of the body 402.

In the illustrated example of FIG. 5, the lining 504 is within the body 502. According to the illustrated example, the sealing material 506 is disposed between an outer surface 510 of the lining 504 and an inner surface 512 of the body 502. Similar to the lining 404 in FIG. 4, in this example, the lining 504 is smooth and does not match the profile of the body 502.

While in the illustrated examples of FIGS. 2, 3, 4, and 5 the bellows have one lining disposed within or outside of the body, in other examples, a bellows may include both a lining disposed outside of the body (i.e., an outer lining) and a lining disposed inside of the body (i.e., an inner lining). In some such examples, one or both of the linings can be formed to match the contour or profile of the body. Further, the sealing material can be contained between both the body and the inner lining and the body and the outer lining.

From the foregoing, it will be appreciated that the above disclosed bellows compensate for and/or repair damage received by the bellows, thereby increasing and/or maximizing protection for sensitive components covered therein. By enabling the bellows to remain sealed, damage and/or failure of such components are prevented while reducing and/or minimizing associated costs and labor that would have otherwise been required or incurred from using conventional bellows.

Although certain example apparatus have been disclosed herein, the scope of coverage of this patent is not limited thereto. On the contrary, this patent covers all apparatus fairly falling within the scope of the claims of this patent.

What is claimed is:

1. A bellows comprising:
    a tubular body being expandable and contractible along an axis of the body;
    a lining disposed along a surface of the body; and
    a liquid or gelatinous material disposed between the body and the lining, the liquid or gelatinous material to flow into an opening in the bellows formed when the bellows is damaged and to harden to seal the opening when exposed to a fluid.

2. The bellows of claim 1, wherein the lining surrounds an outer surface of the body.

3. The bellows of claim 1, wherein the lining is disposed along an inner surface of the body.

4. The bellows of claim 1, wherein the body includes first ribs, and the lining includes second ribs corresponding to the first ribs.

5. The bellows of claim 1, wherein the lining includes at least one of a plastic material or a wax material.

6. The bellows of claim 1, wherein the lining is coupled to an end of the body.

7. The bellows of claim 1, wherein an annular channel is defined between the lining and the body, the liquid or gelatinous material contained within the channel.

8. The bellows of claim 7, wherein the liquid or gelatinous material displaces from the channel when at least one of the body or the lining is punctured.

9. A vehicle comprising:
    a steering assembly; and
    a bellows covering at least a portion of the steering assembly, the bellows having a sealing material that, when the bellows is punctured, hardens to seal the puncture.

10. The vehicle of claim 9, wherein the bellows includes a tubular body and a lining extending along the body, the sealing material contained between the lining and the body.

11. The vehicle of claim 10, wherein the lining is shaped to match a contour of the body.

12. The vehicle of claim 10, wherein the lining is external to the body.

13. The vehicle of claim 10, wherein the lining includes at least one of a plastic material or a wax material.

14. The vehicle of claim 9, wherein the steering assembly includes an inner tie rod and an outer tie rod, the bellows covering a connection between the inner tie rod and the outer tie rod.

15. The vehicle of claim 9, wherein the sealing material is gelatinous.

16. A bellows comprising:
    a tubular body being expandable and contractible along an axis of the body; and
    means for sealing an opening in the body when the body is punctured.

17. The bellows of claim 16, further including means for containing the means for sealing, the means for containing extending along the body.

18. The bellows of claim 17, wherein the means for containing is shaped to match a contour of the body.

19. The bellows of claim 17, wherein the means for sealing is disposed between the body and the means for containing.

20. The bellows of claim 16, wherein the means for sealing hardens when exposed to a fluid.

* * * * *